April 8, 1941.  C. A. NEWMAN  2,237,999
MOTOR
Filed Dec. 7, 1938
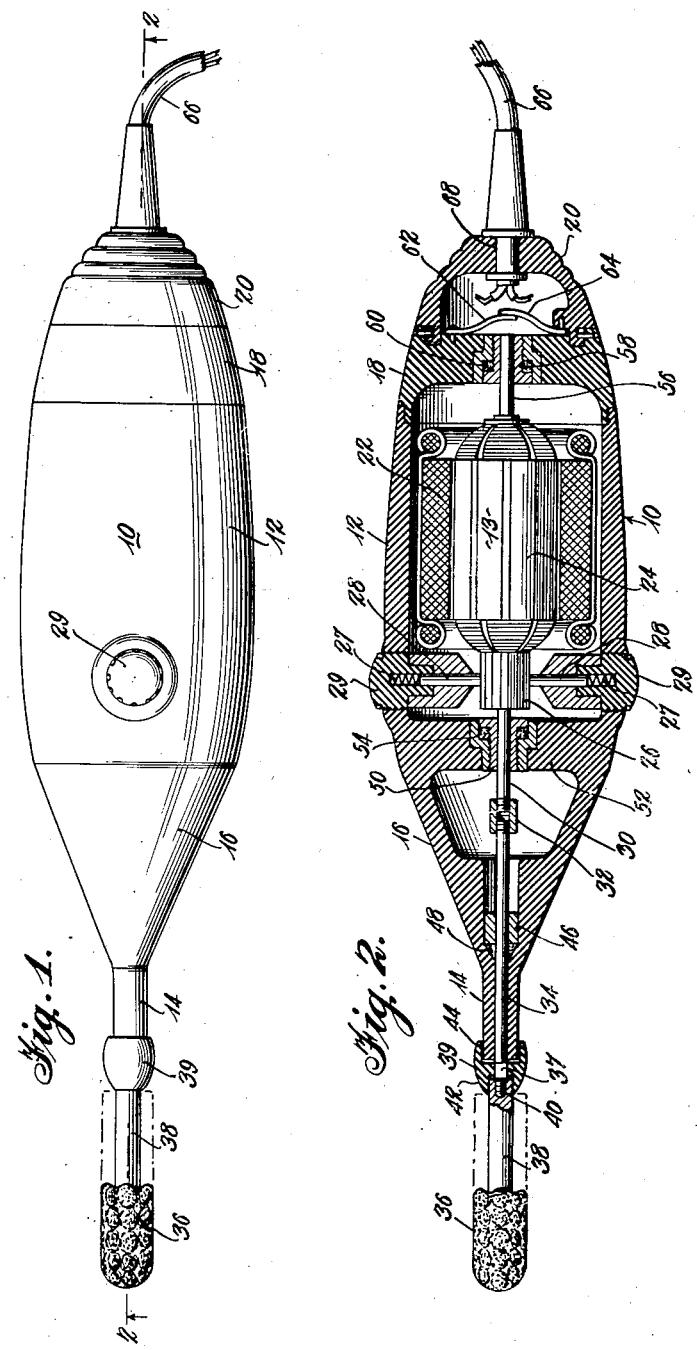
Inventor
Carl A. Newman
By Raymond W Bolton
Attorney Patented Apr. 8, 1941

2,237,999

UNITED STATES PATENT OFFICE 2,237,999

MOTOR

Carl A. Newman, Rochester, N. Y.

Application December 7, 1938, Serial No. 244,472

2 Claims. (Cl. 172—36)

This invention relates to a dental implement, admirably adapted for use as a rotary tooth brush.

Whereas a number of devices of this class have been patented over a period of many years, most of them have been impractical because of involved gearing, complex clutches and chucks, or they have been generally bulky, made of many separate parts and inherently expensive. The present invention proposes to provide an implement of this type with few parts, which is simple in construction, inexpensive, and safe to use without danger of shock to the user or penetration of foreign matter to the operating mechanism.

In accordance with the present invention, a non-conductive housing is provided with an enlarged end of substantially uniform section serving as a handle, and has a relatively reduced end of substantially uniform section integral therewith and joined thereto through an intermediate convergent portion. A rotary electric motor is received within the enlarged portion of the housing and has a rotor shaft extending into the reduced end thereof for the attachment of a dental tool such as a tooth brush. A non-conductive cap is provided for closing the enlarged end of the housing and the rotor is suitably supported in bearings provided in the cap and/or in the housing.

In order to reduce the possibility of shock to the user, the rotor shaft may be provided with a non-conducting coupling intermediate the rotor and the tool. For the same purpose, and in addition to assist in excluding foreign matter from the housing, a non-conducting bridging or guard element may be carried by the rotor shaft at its point of emergence from the housing. The rotor shaft is also packed at convenient points for the exclusion of water or other substances, and such packing may be saturated with oil for lubrication purposes. A suitable switch is contemplated for making and breaking the circuit supplying the motor and speed regulation may also be effected in a known manner.

The implement is preferably balanced in such a way that its center of gravity will lie approximately at the mid-point of the enlarged portion of the housing constituting the handle.

A more complete understanding of the invention will be possible upon reference to the attached drawing wherein:

Fig. 1 is an elevation of the implement; and

Fig. 2 is an elevation partly in section taken along line 2—2 of Fig. 1.

A housing 10 composed of non-conducting material such as hard rubber or synthetic resins is provided with an enlarged end 12 of substantially uniform section serving as a handle for the device and receiving a motor 13. A reduced end 14 of substantially uniform section is made integral with the enlarged portion through an intermediate convergent portion 16. A non-conductive cap 18 is suitably fitted to the enlarged end of the housing as by screw threading or the like to enclose the operating parts. As shown, the cap 18 is provided with a switch handle 20, rotatably assembled thereon, for controlling the circuit used in driving the motor. The housing, cap and switch handle may be molded from plastics of the type contemplated, in accordance with the present day practice and at a relatively low cost.

The motor 13 consists of a stator 22 frictionally or otherwise fixed in the housing, a rotor 24 and a commutator 26. Brushes 28 of the usual type establish the commutator circuit through connections which have been omitted since they constitute no part of the present invention. The brushes are held in position by springs 27 and non-conducting caps 29 of the usual type. A shaft 30 projects from the rotor towards the reduced end of the housing and is joined through a non-conductive coupling 32 to a shaft extension 34 which projects beyond the reduced end of the housing for attachment of a tool. The tool depicted diagrammatically in the drawing is a tooth brush 36 composed of bristles set in a non-conductive support 38. The support may be formed with internal threads 40 for cooperation with similar threads on the end of the rotor shaft extension 34. The shaft extension may be provided with a squared or non-circular portion 37 adjacent its threaded end adapted to receive a bridging member or guard 39 of non-conductive material having a bore complementary with the non-circular portion of the shaft. This guard is of substantially H-shape in section, its oppositely disposed flanges 42 and 44 bridging the adjacent ends of the bristle support and housing respectively. The flange covering the bristle support may engage it frictionally, but the opposite flange will preferably have a slight clearance with respect to the reduced end of the housing. This guard serves not only to exclude water and other foreign matter from the operating parts within the housing but likewise reduces the danger of shock to the user.

Bearings may be suitably arranged within the cap and/or the housing and as shown, a bearing 46 is mounted in the housing near the junction of the converging portion and the reduced end. This bearing is provided with a packing 48 which may be saturated with oil or other lubricant, serving to lubricate the bearing and at the same time further exclude water and other matter from the working parts. Another bearing 50 may be disposed intermediate the bearing 46 and the rotor which has been shown as supported by an inwardly directed flange 52 integral with the housing near the junction of the enlarged end with the convergent portion. Here again a packing 54 saturated with a lubricant may be used.

The opposite end of the rotor is provided with a shaft extension 56 which is shown as received in a bearing 58 carried by the cap 10. This bearing may likewise be equipped with a lubricated packing 60.

A switch for controlling the motor circuit is depicted, by way of example, as carried by the cap 10 and comprises resilient contacts 62 and 64, one of which will be fixed to the cap and the other rotatable with the switch handle 20. Current is supplied through a pair of conductors 66 inserted through an aperture 68 formed in the end of the switch handle.

It will be clear from the foregoing description that the device may be used in a substantially horizontal position under which conditions the operator will grasp the enlarged portion of the housing and since the center of gravity is substantially at the mid-point of this portion, a balanced condition will exist. It will be noted that an operator can use the implement by gripping the reduced portion or convergent portion of the housing between his thumb and forefinger in much the manner a pencil is held, in which event, any position varying from the horizontal to the vertical may be adopted, thereby rendering accessible any portion of any tooth to be worked on. The length of the reduced portion is so designed, that the attached brush or other tool will reach to the rearmost molar of an average adult.

It will be clear that under all conditions and particularly when used for brushing the teeth, there will be no danger of shock to the user since all conductive portions of the implement are enclosed by non-conductive parts.

In order to remove the brush and replace it with another or with a drill, burr or other tool, the user will merely grasp the guard 39 with one hand and the tool or brush with the other, disconnecting the parts by relative rotation in a case where they are attached by threads.

The scope of the present invention should not be restricted to the details of the specific examples set forth in the foregoing description, but should be construed only in accordance with the terms of the appended claims.

I claim:

1. A dental implement comprising a non-conductive housing having an enlarged end of substantially uniform section providing a handle, a reduced end of substantially uniform section integral therewith, and an intermediate convergent portion joining said ends; a rotary electric motor received within said enlarged end having a rotor shaft extending into and projecting beyond said reduced end for attachment of a dental tool; a non-conductive cap closing the enlarged end of said housing; a bearing in said housing for supporting said rotor shaft; and a non-conductive guard covering the projecting end of said shaft and non-rotatably mounted thereon.

2. A dental implement comprising a non-conductive housing having an enlarged end of substantially uniform section providing a handle, a reduced end of substantially uniform section concentric and integral therewith, and an intermediate convergent portion joining said ends; a rotary electric motor received within said enlarged end having a rotor shaft extending into and projecting beyond said reduced end for attachment of a dental tool; a non-conductive cap closing the enlarged end of said housing; bearings in said cap and housing for supporting said rotor shaft; the projecting end of said shaft being provided with a non-circular portion; and a non-conductive guard having a bore complementary with said non-circular portion of said shaft received thereon.

CARL A. NEWMAN.